Aug. 15, 1950 S. BOGEN ET AL 2,519,221
ELECTROMAGNETIC AND PHOTOELECTRIC MECHANISM AND
METHOD FOR CONTINUOUS TUBE GAUGING
Filed July 27, 1945 4 Sheets-Sheet 1

INVENTORS
SAMUEL BOGEN AND
RUTH D. BOGEN
BY Frederick Breitenfeld
ATTORNEY.

Aug. 15, 1950 S. BOGEN ET AL 2,519,221
ELECTROMAGNETIC AND PHOTOELECTRIC MECHANISM AND
METHOD FOR CONTINUOUS TUBE GAUGING
Filed July 27, 1945 4 Sheets-Sheet 2
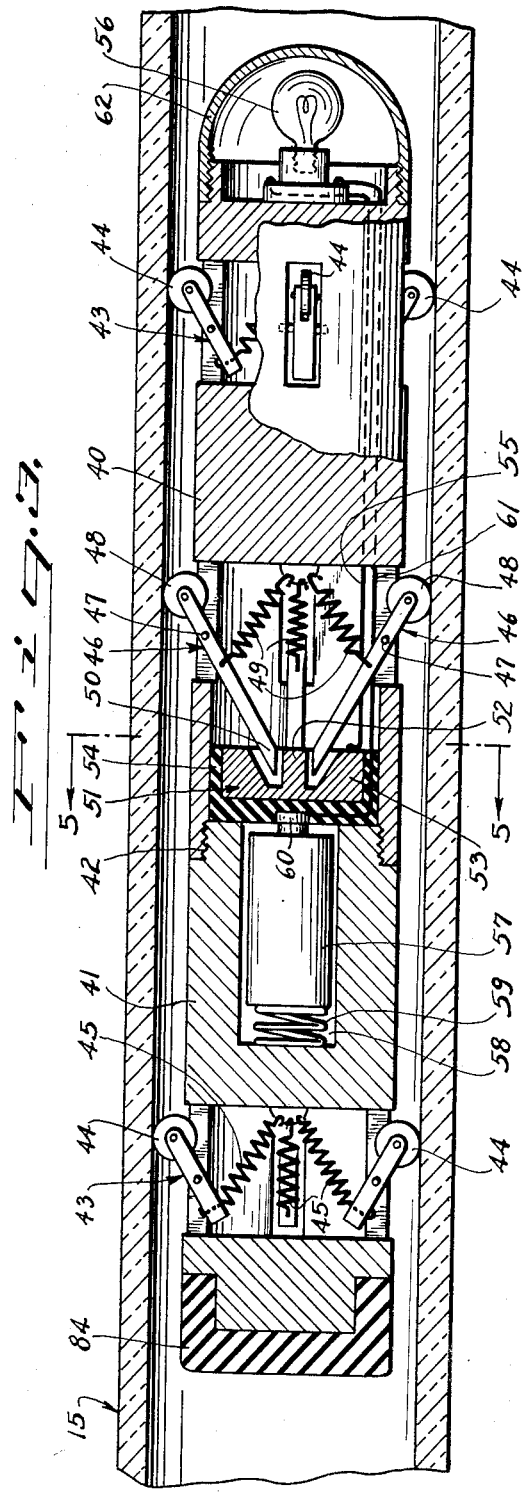
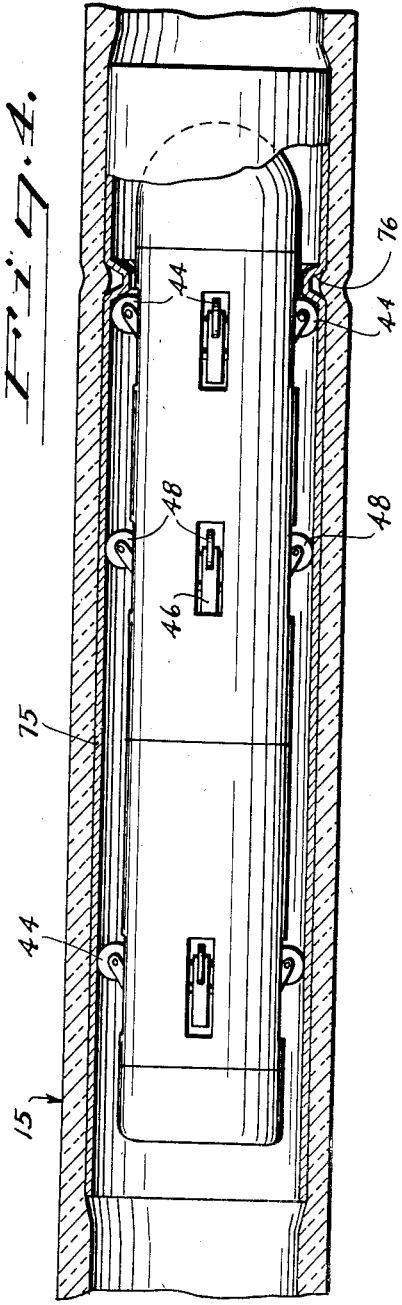
INVENTORS
SAMUEL BOGEN AND
RUTH D. BOGEN
BY
*Frederick Breitenfeld*
ATTORNEY.

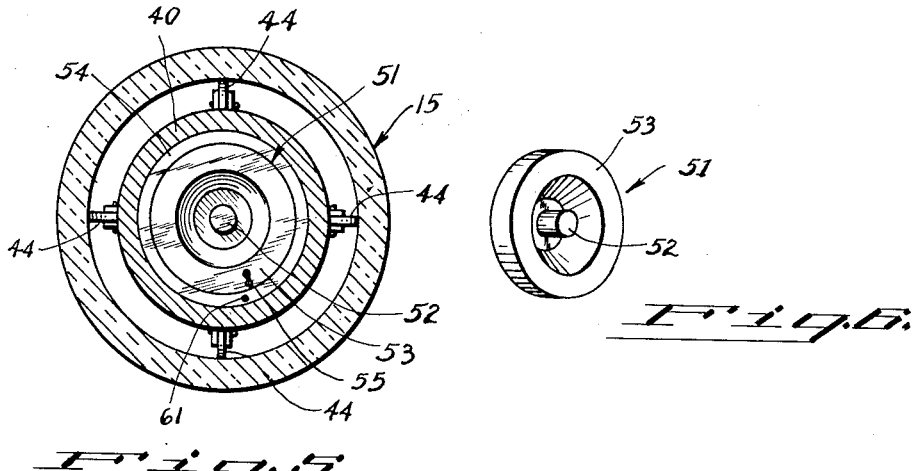
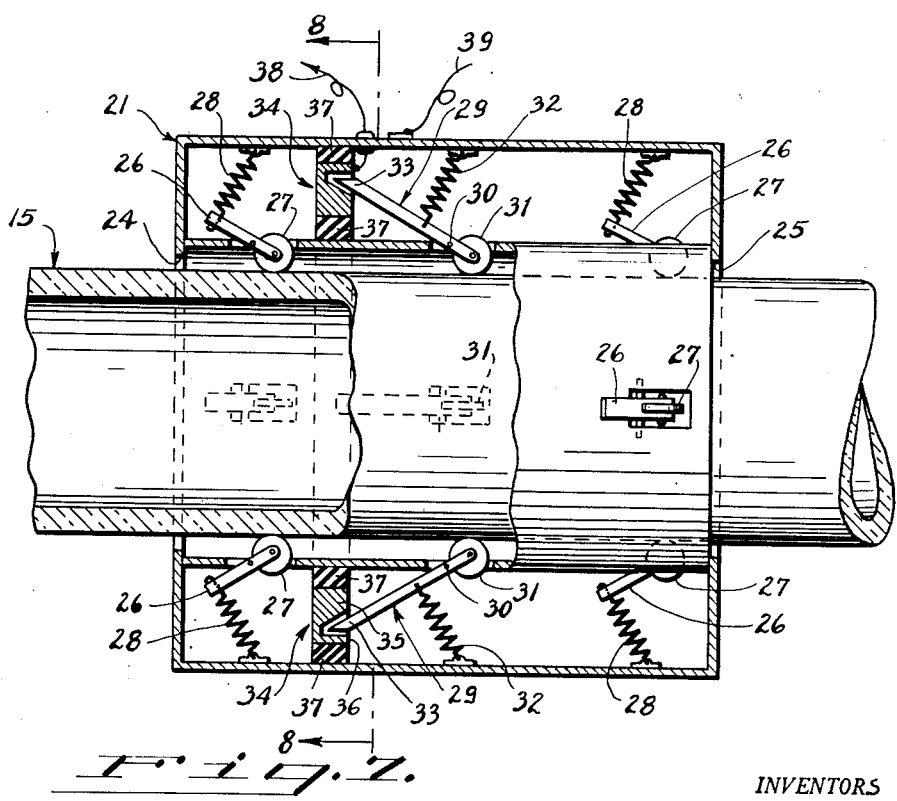

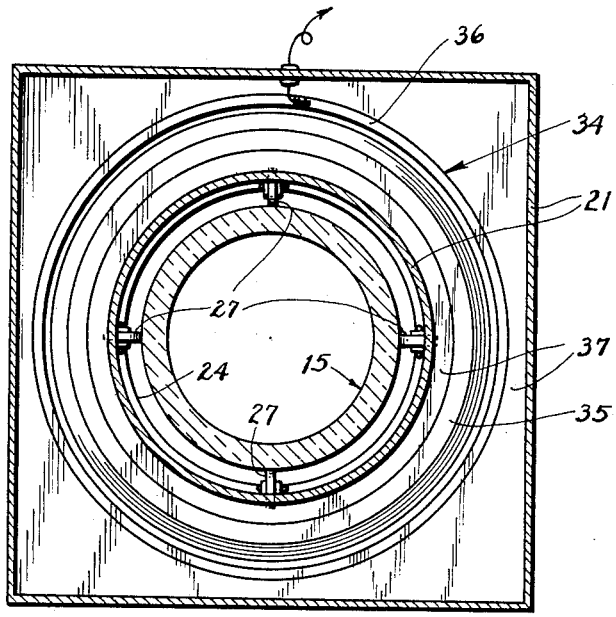
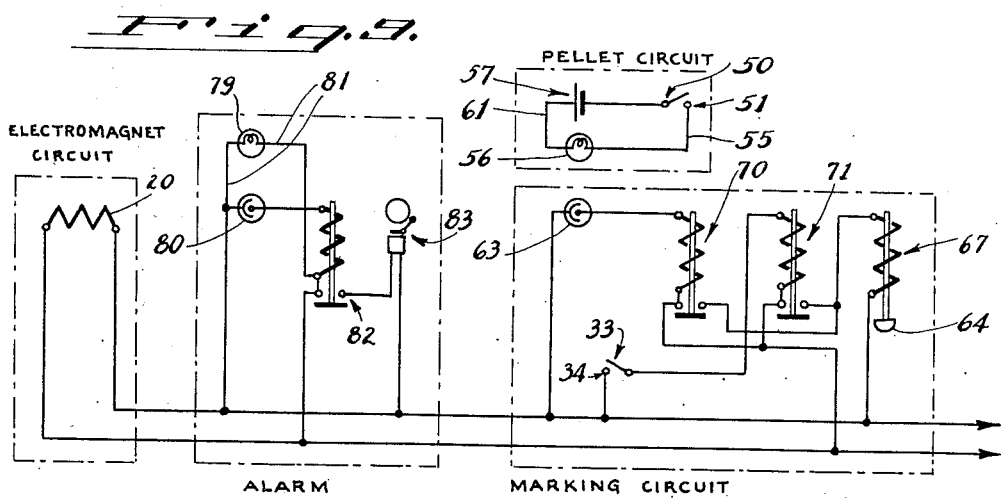

Patented Aug. 15, 1950

2,519,221

UNITED STATES PATENT OFFICE 2,519,221

ELECTROMAGNETIC AND PHOTOELECTRIC MECHANISM AND METHOD FOR CONTINUOUS TUBE GAUGING

Samuel Bogen and Ruth D. Bogen,
New York, N. Y.

Application July 27, 1945, Serial No. 607,446

13 Claims. (Cl. 33—178)

Our present invention relates generally to the gauging of the cross-sectional dimensions of elongated objects, and has particular reference to a method and apparatus for performing a continuous gauging operation upon lengths of tubing or similar rod-like objects, as the latter are caused to advance endwise relative to the gauging means.

The invention is primarily intended for the continuous gauging of tubing, such as glass tubing, to detect significant deviations in an internal or an external dimension, or both; and is uniquely suitable for the continuous gauging of such tubing during its process of manufacture. However, certain phases of the invention are of wider applicability and may readily find utility in other fields in which the gauging of elongated objects, whether tubular or solid, and whether composed of glass or other material, is to be accomplished.

Certain features of the invention are especially applicable to the gauging of one or more internal dimensions of tubing, such as glass, which is composed of light-transmitting material, making it possible in a practical manner to check these dimensions continuously and thereby increase the efficiency of manufacture of tubing having a desired uniformity.

Broadly speaking, the gauge employed is of the type in which a movable gauging element is yieldably pressed against the surface of the elongated object, while an endwise advancement of the object, relative to the gauging element, is caused to take place, whereby significant deviations in the critical dimension or dimensions will impart corresponding movements to the gauging element. These movements, in turn, are translated into suitable signals, preferably electric in character, by means of which the irregular or defective regions of the object may be indicated, ear-marked, or physically handled, in any desired manner.

It is one of the more particular objects of our invention to provide a means whereby a gauge of this general kind may be positioned on the interior of an elongated object of tubular character. Among the special features of our invention are those which relate to the successful achievement of the problems of designing an internal-dimension gauge which would be suitable for the purpose, introducing the gauge into the tubular object, controlling the position of the gauge, and translating the movements of the gauging element or elements into effective and practically useful signals.

The general objectives of the invention, its various novel features, and the ramifications implicit therein, are well exemplified by considering its applicability to the art of continuously manufacturing glass tubing; and for this purpose we have herein illustrated and described a preferred mode of applying the principles and advantages of our invention to this specific field.

Preliminarily, it may be pointed out that a well known process of tubing manufacture consists, briefly, in continuously forming the tubing of molten glass at a forming station, and advancing it endwise to allow it to cool and harden. Usually, a tube drawing equipment is employed which consists of a tank containing molten glass and provided with an aperture in the bottom, together with a rotating hollow refractory pipe extending downwardly into the aperture. The inside of the tubing is shaped by the rotating pipe while the outside is shaped by the aperture in the tank. Compressed air flowing through the pipe into the glass tubing helps to maintain the proper shape and diameter. The tubing passes through the aperture into room air, usually for a distance of from ten to fifteen feet, when it is then cool and hard enough to be drawn over rollers on a runout table for another several hundred feet. On the runout table it is further cooled and reaches its full hardness, and the tubing is then generally passed between drawing wheels which carry it forward usually to a cutting machine for cutting the tube into lengths. The practice heretofore has been to sample batches of the cut lengths of tubing, to determine and check its uniformity. Thus, one or two tubes from a batch are manually or otherwise tested for the accuracy of their cross-sectional dimensions; if satisfactory, that batch is passed; if unsatisfactory, the entire batch from which the samples are taken is discarded. This is obviously a wasteful and haphazard procedure.

By means of our invention, a gauging means is provided whereby deviations from standard dimensions may be continuously indicated, either on the tubing or otherwise, prior to its being cut, thereby allowing removal of only the defective or irregular portions of the tubing or of those particular cut lengths which are marked or indicated as defective or irregular.

In the preferred embodiment of the invention, we employ both an external-dimension gauge and an internal-dimension gauge. Each is so designed that it activates a tube-marking intrumentality in response to significant deviations in the dimensions respectively gauged thereby. For gauging the external dimensions, the gauge is preferably in the form of a hollow body with the movable gauging elements pivoted on the inside. For gauging the internal dimensions, the gauge is preferably in the form of a substantially cylindrical device or pellet with pivoted gauging elements projecting laterally. Each gauging element may be at the end of a lever whose inner end defines a movable electric contact adapted to cooperate with a fixed contact having opposed sections between which the movable contact is disposed. The parts are so adjusted that the movable contact is normally spaced from both sections of the fixed contact, but touches one or the other of these sections when a significant irregularity in dimensions causes the lever to pivot.

The maintenance of the external gauge in stationary relation to the advancing tube presents no special problem. The internal gauge is controlled by a positioning member on the exterior of the tube, and a means for establishing a magnetic attraction between the gauge pellet and the positioning member. A means is also provided for signaling a possible dislocation of the pellet.

The movements of the gauging elements on the external gauge may be caused to affect directly an electric circuit controlling an indicator or marking device. On the other hand, the movements of the gauging elements on the internal gauge are caused to control a circuit which transmits significant energy signals through the tube wall, these signals being utilized to affect the indicating or marking instrumentality.

These and other features of the invention are illustrated in the accompanying drawings, in which:

Figure 3 shows the internal gauge in cross-section within the glass tube;

Figure 4 shows the internal gauge within its non-magnetic starting cylinder;

Figure 5 is a cross-sectional view of the internal gauge taken along the line 5—5 of Figure 3;

Figure 6 is a perspective view of the fixed electric contact ring by itself;

Figure 7 is a cross-sectional view of the external gauge shown in association with the glass tube;

Figure 8 is a cross-sectional view taken along the line 8—8 of Figure 7; and

Figure 9 is a diagram of the electric circuits.

Figure 1:
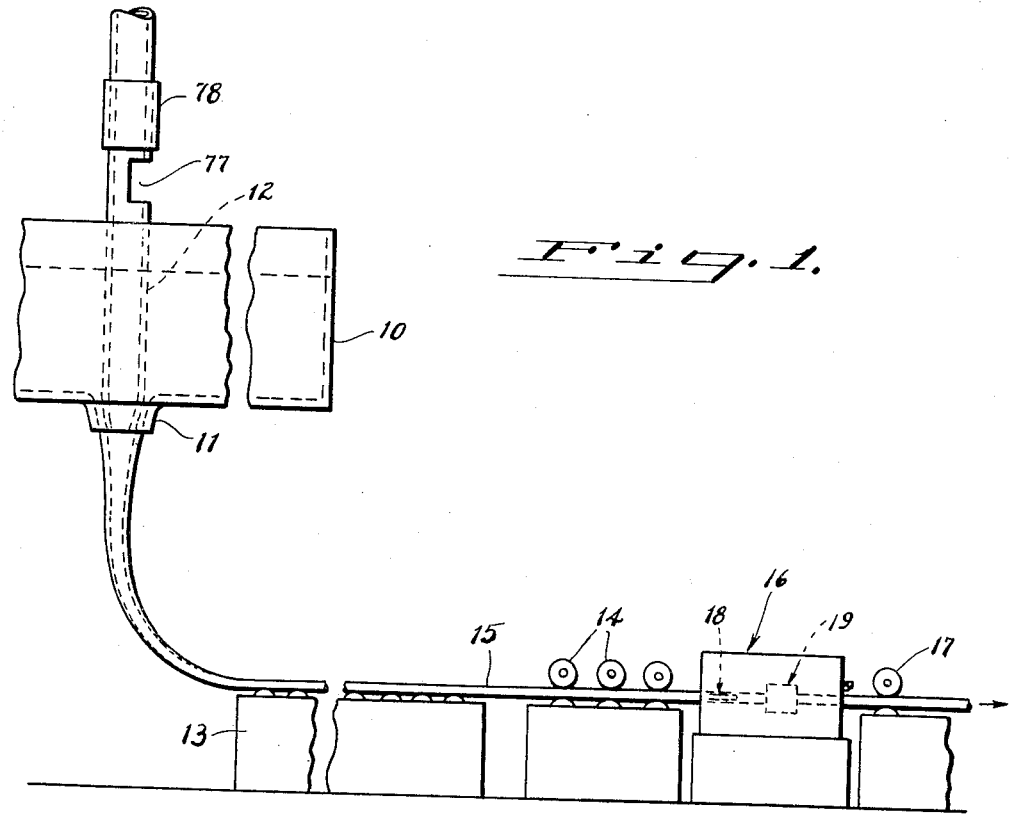
Figure 1 is a diagrammatic view of typical equipment employed for continuously forming and drawing glass tubing.

The apparatus illustrated in Figure 1 consists essentially of a tank 10 containing molten glass and provided in its bottom with an outlet nipple or aperture 11. Extending downwardly through the tank and into the aperture 11 is a hollow pipe 12 through which compressed air is directed, whereby the molten glass flows downwardly around this pipe in tubular form, gradually cooling and hardening and being directed over a runout table 13. The elements shown in Figure 1, and their respective dimensional characteristics and proportions, are exaggerated, as will be understood by those skilled in the art.

After passing between the drawing rollers 14, the tubing 15 enters the present gauging apparatus (designated generally by the reference numeral 16), and may then be directed between a set of guide rollers 17 to a final cutting station (not shown).

Figure 2:
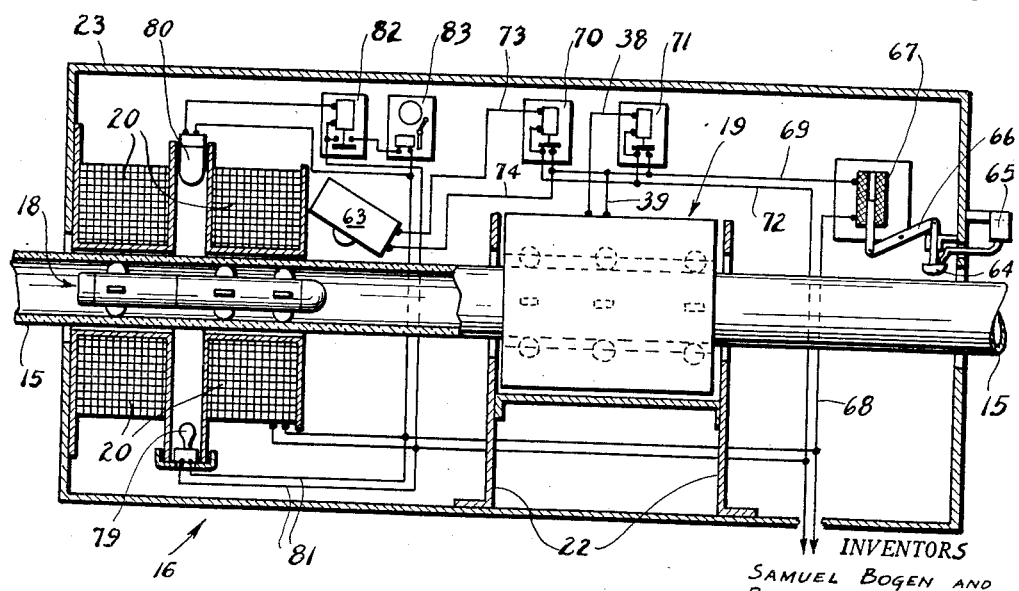
Figure 2 is a partial cross-sectional view of the tube gauging assembly illustrating its application to the gauging of both the internal and external cross-sectional dimensions of the glass tubing.

The gauging apparatus shown in Figure 2 consists of an internal-dimension gauge 18 and an external-dimension gauge 19. The former is a substantially cylindrical body or pellet illustrated in detail in Figure 3; it is held stationary with respect to the advancing tube 15 by means of an electromagnet 20 mounted to surround the exterior of the tube 15. The external gauge is illustrated in detail in Figure 7 and comprises an annular housing 21 (see Figure 7) through which the tube 15 passes. It is held stationary with respect to the tube by means of a fixed frame or support comprising spaced uprights 22; the housing 21 bears endwise against one of these uprights when the tube 15 is advancing, but for the sake of clearness, this abutting relationship is not shown in Figure 2.

The gauge 19 and the electromagnet 20, together with the other electrical and mechanical elements entering into the complete apparatus, may be conveniently mounted within a fixed enclosure 23, of any suitable shape and construction.

Referring now to Figures 7 and 8, it will be observed that the annular housing has an axially-disposed entrance opening 24, through which the tube 15 enters, and an aligned exit opening 25, through which the tube leaves. The inner wall of the annular housing 21 is provided with a series of circumferentially-arranged openings within which levers are pivoted. Two sets of these levers, designated 26, carry guide rollers 27 which are yieldably pressed into rolling contact with the surface of the tube 15 by means of springs 28 or the like. These rollers keep the tube 15 in a sort of floating relationship as it passes through the gauge. We have shown two sets of these guide rollers, four to each set, but obviously this particular arrangement is optional.

The third set of levers 29 is similarly pivoted, as at points 30, and each lever carries a roller 31 at its projecting end. These rollers constitute dimension-gauging elements, and they are preferably four in number, although it will be understood that a lesser or greater number may be employed, if desired. Each of the gauging elements is yieldably pressed against the external surface of the tube 15, this being accomplished by means of springs 32 or the like. Obviously, each gauging element is movable by virtue of the pivotal support which each corresponding lever affords, but so long as the tube surface retains a predetermined external diameter or dimension, no appreciable movement of any of the gauging elements will take place. However, any significant deviation from the desired dimension will impart a corresponding movement to one or more of the gauging elements. In the embodiment illustrated, it makes no difference whether this movement is inward or outward, since the rear end of each lever 29 is formed as a movable electric contact 33 which functions in either case.

Mounted circumferentially within the housing 21 is a fixed electric contact in the form of a ring 34 having two opposed sections 35 and 36 lying on opposite sides, respectively, of each movable contact 33. Where the housing 21 is composed of metal, as is preferred, the ring 34 is mounted in insulated relation to it, as by means of insulating supports 37. The contacts form a series of make-and-break switches, in parallel relationship, in an electric circuit hereinafter to be described, the fixed contact 34 being connected to the circuit as shown at 38, the movable contacts being connected, as at 39, through the metallic housing itself.

It will be observed that the contact end 33 of each lever 29 is tapered to a wedge-like shape, and that the inner and outer sections 35 and 36 of the fixed contact 34 are correspondingly contoured. This provides a flat contact area of effective size regardless of the direction of movement of the movable contact.

Under normal circumstances, i. e., so long as a predetermined external dimension of the tube 15 presents itself to the gauging elements 31, the movable contacts 33 are spaced from both sections 35 and 36 of the fixed contact 34, and the make-and-break switches are thus all open and the electric circuit is open.

The internal-dimension gauge (see Figure 3) is similarly provided with guide wheels and gauging elements. It is a pellet-like body which may be conveniently composed of front and rear sections 40 and 41 separably screwed together as at 42, at least one, and preferably both, of these sections being composed of magnetically-responsive and electrically-conductive metal. Pivotally mounted in suitable recesses are levers 43 carrying guide wheels 44 on their outer ends, these wheels being pressed into rolling contact with the internal surface of the wall of the tube 15 by means of springs 45. The guide wheels maintain the pellet in substantially centered relation to the tube 15, and serve also to maintain a passage around the pellet for free flow of the air in the tube. We have shown two sets of guide wheels, one near the front end and one near the rear end of the pellet, each set consisting of four circumferentially spaced wheels, but these particulars are optional.

The rear portion of the pellet section 40 is suitably configured and recessed to accommodate another set of levers 46 each of which is pivoted for rocking movement, as at 47, and each of which has a roller 48 at its outer end. These rollers serve as movable gauging elements and are held yieldably against the tubing wall by springs 49. We have shown four such elements, spaced circumferentially, but these may be of lesser or greater number, if desired.

The rear ends 50 of the levers 46 are constructed as movable electric contacts which cooperate with a stationary ring-shaped contact 51 having an inner section 52 (see Figure 6) and a spaced outer or rim section 53. These sections are positioned on opposite sides of each movable contact 50 and under normal circumstances, i. e., so long as a predetermined internal tube dimension is maintained, the movable contacts 50 are spaced from both sections 52 and 53 of the fixed contact 51. Each of the movable contacts 50 may be tapered, as shown, and the contact sections 52 and 53 correspondingly configured, so that when any of the movable contacts is caused to touch the fixed contact, in either direction of movement, an electrical connection will be established along an area of appreciable size.

The ring contact 51 is mounted in insulated relation to the pellet by means of an insulating support 54. It is connected electrically, by means of an insulated wire 55 or the like, to one terminal of an electrical lamp 56 mounted on the pellet, preferably at the forward end, as shown.

The movable contacts 50 in cooperation with the fixed contact 51 constitute a series of make-and-break switches in parallel relationship, the closing of any one of which is intended to close an electric circuit which will energize the lamp 56. This circuit includes a battery 57 which may be carried by the pellet in any convenient manner and which we have shown disposed within a recess 58 in the rear pellet section 41, the lateral terminal being in direct electrical contact with the pellet itself (hence with the movable contacts 50), by means of a spring 59 or the like, this spring pressing the center terminal of the battery against a contact 60 mounted within the insulating support 54. The contact 60 is connected by means of an insulated wire 61 or the like to the second terminal of the lamp 56.

The lamp 56 constitutes a source of energy which may be utilized to transmit useful signals through the wall of the tube 15. Other energy signals may be employed, if desired, but a lamp is quite suitable for the purpose where the tubing 15 is of light-transmitting material such as glass.

A transparent protective shield 62 is preferably mounted over the lamp 56; and it may be desirable to secure a rubber or resilient cap 84 to the rear end of the pellet for a similar protective purpose.

The signals, such as the light signals, emanating from the pellet whenever one or more of the internal-dimension gauging elements rides over a tube section of defective or irregular internal dimension, are caused to affect a suitably responsive device mounted exteriorly of the tube. In Figure 2 we have shown such a device at 63; it may be a photoelectric cell or the like, and it is receptively positioned with respect to the lamp 56, as shown. It is arranged in an electric circuit which is thus made responsive to significant deviations in the internal dimensions of the tube. This circuit is best shown in Figures 2 and 9, as it may be employed for the purpose of imposing visible marks upon the tubing to indicate those sections which are defective or irregular in either internal or external dimensions.

For illustrative purposes, we have diagrammatically shown a marking instrumentality 64 in the form of an inking pad or the like furnished with a continuous supply of ink from a reservoir 65. The pad 64 is mounted, as shown, so as to be movable toward and away from the tube 15 by pivotal movements of a lever 66, these movements being controlled by a solenoid 67. One terminal of the solenoid is connected, as at 68, to a main source of electric current (not shown). The other terminal is connected, as at 69, to two relays 70 and 71 arranged in parallel and connected to the current source at 72. The relay 70 is activated by the device 63 through the electrical connections 73 and 74. The relay 71 is activated by the make-and-break contacts 33 and 34 (Figure 7) associated with the external-dimension gauge, through the electrical connections 38 and 39.

Each of the relays 70 and 71 is of the well-known time-delay type, and is adjustable to conform with the speed of advancement of the tube 15 and to compensate for the longitudinal distances between the marking instrumentality 64 and the internal-dimension and external-dimension gauges, respectively.

The initial introduction of the internal-dimension gauge or pellet into the tubing 15 is preferably accomplished in the manner best illustrated in Figures 1 and 4. The pellet is inserted endwise into a special cylinder 75 composed of non-magnetic material and adapted to accommodate the pellet quite snugly. These two elements are so constructed that the pellet may be introduced only through one end of the cylinder, and may not escape through the other end. One way of achieving this result is to form an internal shoulder 76 near the forward end of the cylinder, positioned to serve as an abutment against which the forward set of guide wheels 44 will rest when the pellet is completely inserted. This assembly of pellet and cylinder is now introduced into the pipe 12 (Figure 1) through a special port 77 provided for this purpose. A sleeve 78 may be slid into and out of a position which normally seals this port.

As the assembly passes downwardly through and out of the pipe 12, the cylinder 75 becomes embedded in the wall of the tubing 15 as indicated in Figure 4, and in this embedded condition the assembly is carried along with the tubing as the latter cools and hardens. At a suitably remote stage at which the tubing has hardened, the electromagnet 20 (Figure 2) becomes effective to establish a magnetic attraction between itself and the pellet, thus arresting further advancement of the latter. The cylinder 75, being of non-magnetic material, is carried along by the tubing, and at the cutting station (not shown) it may be recovered for subsequent re-use by simply smashing the tube section in which it is embedded.

During normal functioning of the apparatus, the pellet remains in the position shown in Figure 2. Under unusual circumstances, however, it may become dislocated and move out of the controlling range of the magnet 20. To indicate this occurrence, it is desirable to position a source of energy, such as the lamp 79, on one side of the tube in the region where the pellet is normally held, and to arrange an energy-responsive device, such as the photoelectric cell 80, on the remote side of the tube, these parts being so disposed that the transmission of energy from one to the other is normally intercepted and prevented by the pellet itself.

The lamp 79 may be connected, as at 81, to the main current supply, and the device 80 is connected in this "alarm circuit" in series with a relay 82 and a suitable alarm, such as an electric bell 83 or the like. The relay 82 is obviously not of the time-delay character, since its functioning is to be immediate. To facilitate the desired arrangement of parts, the magnet 20 may be formed in two sections, as shown, thereby leaving a suitable space for accommodation of the elements 79 and 80 and for the desired transmission of energy, from one to the other, across the space normally occupied by the pellet.

The various elements of the external electric circuits controlling the marking instrumentality 64 and the signal 83, as well as the parts 64 and 83 themselves, may be suitably mounted in or secured to the main housing 23, as diagrammatically indicated in Figure 2, or they may be supported and arranged in any other suitable or convenient manner, as will be understood. The electric circuits themselves are best illustrated in Figure 9 in which the reference numerals correspond to those herein referred to, and in which there are clearly depicted the "electromagnet circuit," the "alarm circuit," the "pellet circuit," and the "marking circuit," as hereinbefore described.

As applied to the art of manufacturing glass tubing or the like, the operation of the apparatus and the method of practicing the invention will be clear from the description given. After the tube-forming process has been initiated, and the continuously-advancing tube has been threaded through the apparatus, the external-dimension gauge is ready to function. To bring the internal-dimension gauge into operative position, the compressed-air feed is temporarily halted, and the pellet-cylinder assembly is introduced into the pipe 12. The port 77 is then closed and the compressed air is turned on again, thus pushing the assembly through the aperture 44 whereupon the cylinder 75 becomes embedded in the plastic tube wall. The cylinder 75 has an internal diameter substantially the same as that of the desired tubing and an external diameter slightly smaller than that of the tubing. Once the pellet has come within the field of action of the electromagnet 20 and has been held against further advancement (under the urgence of friction and the compressed air passing through the tube), the internal-dimension gauge is ready to function.

Both the internal and the external gauges will of course be of such design and size, relative to the tubing with which they are used, that a continued maintenance of predetermined internal and external dimensions will leave all the make-and-break switches in open condition. Where a marking instrumentality is used, it will remain inoperative so long as this normal state of affairs continues to exist. However, the moment any significant deviation in either the internal or external dimensions of the tube causes a corresponding movement of any one or more of the movable gauging elements, an electric response is caused to become automatically effective to render the marking device operative to impose a mark or streak upon that portion of the tubing which is dimensionally irregular. The manufacturing process is not interrupted by this action, and the marking device ceases to function as soon as the irregularity has passed, all the parts immediately resuming their normal relationships whenever the tube dimensions again conform to the desired sizes.

In case an internal irregularity is of such unusual character that it cannot pass the pellet, it encounters the relatively soft cap 84 at the rear of the pellet and carries the latter along with it. This prevents the encounter from breaking the tube and thus avoids any serious disruption of the manufacturing procedure; and since the dislocation of the pellet is immediately indicated by the alarm circuit, the pellet may be readily recovered and restored to its normal position by re-introducing it into the pipe 12 as hereinbefore described.

The invention is obviously of such nature that either the external gauge or the internal gauge may be used independently, if desired. And the usefulness of the gauges is not restricted to objects or tubes of circular cross-section. By suitably shaping the pellet and appropriately arranging the one or more gauging elements which it carries, various internal dimensions may be gauged whether the cross-sectional shape is circular, elliptical, or otherwise; and, similarly, by appropriately arranging one or more of the external gauging elements, various external dimensions may be gauged regardless of the over-all shape.

Nor are the gauges limited in their usefulness to a detection of over-all size deviations. Since the movable gauging elements may be positioned in circumferential groups, and since movement of any one of them may be caused to set the electric response into operation, the gauges are capable of detecting not only diameter variations, but also eccentricities and isolated bumps or hollows.

The imposition of marks on the tubing or other elongated object which is subjected to the continuous gauging process permits any of various subsequent procedures to be followed. For example, the object may be cut into predetermined lengths, and those which bear any of the present markings or streaks may be discarded or set aside; or the object may be so cut into lengths that only the marked portions, regardless of their lengths, are separated from the rest. And these steps may, if desired, be carried out automatically by utilizing the markings to activate or de-activate suitably-arranged photoelectric devices arranged to control apparatus for cutting the elongated object, or sorting or discarding predetermined cut lengths or portions thereof.

Under certain circumstances, the magnetic attraction by means of which the internal-dimension gauge is positionally controlled may be established in a reverse manner, i. e., by incorporating a magnet with the pellet itself and utilizing a magnetically-responsive positioning member, composed for example of soft iron, on the exterior of the tube. Or, regardless of how this magnetic holding effect may be produced, the positioning member might be caused to move and carry the internal gauging element with it while the tube is held relatively stationary. The same possibility applies to the external gauge: if the gauge is moved and the tube or object held relatively stationary, a similar gauging effect will result. As a practical matter, however, it is preferable to retain the gauges in a stationary condition and to allow the elongated object or tube to advance past them, especially where the invention is to be employed in connection with a continuous manufacturing process of the character described herein.

The size of the object which may be gauged by means of this invention is unlimited so far as its external dimensions are concerned, and if the object be a tube its internal diameter is limited only by the pellet size that may be required to form a practical internal-dimension gauge of the character described. The pellet construction herein illustrated by way of example is designed primarily for use in the gauging of glass tubing such as that which is presently employed in the manufacture of fluorescent lighting tubes.

In general, it is to be understood that many of the details herein described and illustrated are purely illustrative, and that alterations in these details by those skilled in the art will not necessarily constitute departures from the spirit and scope of the invention as expressed in the appended claims.

Having thus described our invention and illustrated its use, what we claim as new and desire to secure by Letters Patent is:

1. In a gauge for indicating deviations in the internal cross-sectional dimensions of an elongated tube, a supporting pellet within the tube, a movable gauging element carried by said pellet and yieldably pressed against the wall of said tube, and means for causing relative movement between the tube and pellet in the direction of the tube axis, whereby significant deviations in the internal tube dimensions will impart corresponding movements to said gauging element, said means including a positioning member on the outside of the tube, said positioning member and said pellet being susceptible to mutual magnetc attraction, and means for establishing magnetic attraction, through the tube wall, between said member and said pellet.

2. In a gauge for indicating deviations in the internal cross-sectional dimensions of an elongated tube, a supporting pellet within the tube, a movable gauging element carried by said pellet and yieldably pressed against the wall of said tube, and means for causing relative movement between the tube and pellet in the direction of the tube axis, whereby significant deviations in the internal tube dimensions will impart corresponding movements to said gauging element, said means including a positioning member on the outside of the tube, and means for establishing magnetic attraction, through the tube wall, between said member and said pellet, said member being an electromagnet and said pellet having a portion responsive to magnetic attraction.

3. In a gauge for indicating deviations in the internal cross-sectional dimensions of an elongated tube of indefinite length which is continuously advancing endwise, a supporting pellet within the tube, a movable gauging element carried by said pellet and yieldably pressed against the wall of said tube, and means for holding the pellet in a relatively stationary position as the tube continues to advance past it, so that significant deviations in the internal tube dimensions will impart corresponding movements to said gauging element, said means comprising a relatively stationary positioning member on the outside of the tube, said positioning member and said pellet being susceptible to mutual magnetic attraction, and means for establishing magnetic attraction, through the tube wall, between said member and said pellet.

4. In a gauge for indicating deviations in the internal cross-sectional dimensions of an endwise-advancing elongated tube, a gauge-carrying pellet within the tube, means for holding the pellet in a relatively stationary position, said means comprising a relatively stationary positioning member on the outside of the tube, said positioning member and said pellet being susceptible to mutual magnetic attraction, means for establishing magnetic attraction, through the tube wall, between said member and said pellet, and warning mechanism responsive to longitudinal dislocation of said pellet relative to said positioning member.

5. In a gauge for indicating deviations in the internal cross-sectional dimensions of an endwise-advancing elongated tube, a gauge-carrying pellet within the tube, means for holding the pellet in a relatively stationary position, said means comprising a relatively stationary positioning member on the outside of the tube, said positioning member and said pellet being susceptible to mutual magnetic attraction, means for establishing magnetic attraction, through the tube wall, between said member and said pellet, and warning mechanism responsive to longitudinal dislocation of said pellet relative to said positioning member, said mechanism comprising a source of energy on one side of the tube, and a device responsive to said energy on the opposite side of the tube, said device being so disposed that the energy reception is intercepted by the pellet when the latter is under the control of said positioning member.

6. In a gauge for indicating deviations in the internal cross-sectional dimensions of an elongated tube, a movable gauging element within the tube, means yieldably pressing said element against the wall of said tube, means for causing endwise advancement of said tube relative to said element, and indicating means responsive to the movements imparted to said gauging element by significant deviations in the internal dimensions of said tube, said indicating means comprising a source of radiant energy in the interior of the tube, means controlled by movements of the gauging element for activating said source, and an energy-responsive device on the exterior of the tube receptively positioned with respect to the energy transmitted from said source through the tube wall.

7. In a gauge for indicating deviations in the internal cross-sectional dimensions of an elongated tube, a movable gauging element within the tube, means yieldably pressing said element against the wall of said tube, means for causing relative movement between the tube and gauging element in the direction of the tube axis, said means including a positioning member on the outside of the tube and electromagnetically controlling the longitudinal disposition of said gauging element relative to the tube, and indicating means responsive to the movements imparted to said gauging element by significant deviations in the internal dimensions of said tube.

8. In a gauge for indicating deviations in the cross-sectional dimensions of an endwise advancing tube, a housing provided with entrance and exit openings for the passage therethrough of said tube, an external-dimension gauge in the housing including movable gauging elements in contact with the external surface of the tube, an internal-dimension gauge within the tube composed at least in part of magnetically-responsive metal and including movable gauging elements in contact with the internal surface of the tube, an electromagnet within the housing and encircling the tube for maintaining the internal-dimension gauge in position by magnetic attraction, and an electric circuit responsive to movements of said gauging elements as they encounter irregularities in the tube wall.

9. A method of continuously gauging an internal dimension of glass tubing during its process of manufacture, which consists in positioning an internal-dimension gauge within the tubing, advancing the tubing endwise while holding the gauge stationary by magnetic attraction effective through the wall of the tubing, and transmitting energy signals from said gauge through said wall in response to significant deviations in said internal dimension.

10. The combination with an internal-dimension gauge adapted to be positioned within a tube and composed at least in part of magnetically-responsive metal, of a magnet arranged in proximity to said gauge on the exterior of the tube and operative through the tube wall for holding said gauge stationary relative to the tube as the latter is advanced endwise relative to said gauge.

11. In a device which coacts with the internal wall of an endwise-advancing elongated tube, a relatively stationary positioning member on the outside of the tube, a pellet within the tube, said pellet and positioning member being susceptible to mutual magnetic attraction, means for establishing magnetic attraction through the tube wall between said positioning member and said pellet, and warning mechanism responsive to longitudinal dislocation of said pellet relative to said positioning member.

12. In a device for gauging the internal wall of an elongated tube of indefinite length which is continuously advancing endwise, a gauge-carrying pellet within the tube, means on the outside of the tube and effective through the wall of the tube for holding the pellet stationary relative to the advancing tube, and warning mechanism normally inactive while the pellet is held by said holding means and adapted to become active upon longitudinal dislocation of said pellet relative to said holding means.

13. In a device for gauging the internal wall of an elongated tube of indefinite length which is continuously advancing endwise, a gauge-carrying pellet within the tube, means on the outside of the tube and effective through the wall of the tube for holding the pellet stationary relative to the advancing tube, and warning mechanism normally inactive while the pellet is held by said holding means and adapted to become active upon longitudinal dislocation of said pellet relative to said holding means, said warning mechanism comprising a source of energy on one side of the tube, and a device responsive to said energy on the opposite side of the tube, said device being so disposed that the energy reception is intercepted by the pellet when the latter is under the control of said holding means.

SAMUEL BOGEN.
RUTH D. BOGEN.

REFERENCES CITED

The following references are of record in the file of this patent:

UNITED STATES PATENTS

| Number | Name | Date |
|---|---|---|
| 713,784 | Mellor | Nov. 18, 1902 |
| 1,133,300 | McGauley | Mar. 30, 1915 |
| 1,298,463 | Corl et al. | Mar. 25, 1919 |
| 1,303,259 | Danner | May 13, 1919 |
| 1,632,076 | Hubbard | June 14, 1927 |
| 1,682,464 | Arelt et al. | Aug. 28, 1928 |
| 2,030,244 | Cox | Feb. 11, 1936 |
| 2,123,355 | Feehrer et al. | July 12, 1938 |
| 2,150,017 | Barnard | Mar. 7, 1939 |
| 2,233,572 | Atkins | Mar. 4, 1941 |
| 2,241,401 | Haskell | May 13, 1941 |
| 2,260,354 | Wallace | Oct. 28, 1941 |
| 2,311,387 | Hastings | Feb. 16, 1943 |
| 2,332,573 | Hibschmann et al. | Oct. 26, 1943 |
| 2,332,983 | Bjorkbom | Oct. 26, 1943 |
| 2,386,643 | Wallace | Oct. 9, 1945 |